United States Patent
Kang et al.

(10) Patent No.: US 10,215,576 B2
(45) Date of Patent: Feb. 26, 2019

(54) ENERGY-OPTIMIZED VEHICLE ROUTE SELECTION

(71) Applicant: GM GLOBAL TECHNOLOGY OPERATIONS LLC, Detroit, MI (US)

(72) Inventors: Jun-mo Kang, Ann Arbor, MI (US); Yiran Hu, Shelby Township, MI (US); Steven E. Muldoon, Royal Oak, MI (US); Chen-fang Chang, Bloomfield Hills, MI (US); Dongxu Li, Troy, MI (US); Junfeng Zhao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 15/247,243

(22) Filed: Aug. 25, 2016

(65) Prior Publication Data
US 2018/0058868 A1 Mar. 1, 2018

(51) Int. Cl.
| | |
|---|---|
| *G06F 17/00* | (2006.01) |
| *G01C 21/34* | (2006.01) |
| *G05D 11/00* | (2006.01) |
| *G05D 1/00* | (2006.01) |
| *B60W 20/12* | (2016.01) |

(Continued)

(52) U.S. Cl.
CPC .......... *G01C 21/3469* (2013.01); *B60K 6/22* (2013.01); *B60K 6/50* (2013.01); *B60W 20/12* (2016.01); *G01C 21/343* (2013.01); *G01C 21/3492* (2013.01); *G01C 21/3605* (2013.01); *G01C 21/3626* (2013.01); *G01C 21/3655* (2013.01); *G01C 21/3667* (2013.01); *G01C 21/3691* (2013.01); *B60Y 2200/92* (2013.01);
(Continued)

(58) Field of Classification Search
CPC .... B60W 20/12; B60W 50/00; B60W 30/188; G01C 21/3469; G01C 21/3492; G01C 21/34; F02D 29/02; F02D 41/00; F02D 11/105; B60L 15/2045; H02M 7/53875; F01L 9/04; G09B 19/16; G05D 1/00; G05D 11/00; G06F 17/00
See application file for complete search history.

(56) References Cited

U.S. PATENT DOCUMENTS

| | | | |
|---|---|---|---|
| 6,332,446 B1 * | 12/2001 | Matsumoto | F01L 9/04 123/198 F |
| 6,808,471 B1 * | 10/2004 | Bauerle | F02D 11/105 123/481 |

(Continued)

*Primary Examiner* — Yuri Kan
(74) *Attorney, Agent, or Firm* — Quinn IP Law

(57) ABSTRACT

A method for generating energy-optimized travel routes with a vehicle navigation system includes generating candidate travel routes between a route origin and one or more route destinations, and then dividing each candidate travel route into a plurality of route segments. The method includes estimating expected travel speeds along each segment using cloud information and calculating an expected energy efficiency over each of the candidate travel routes using one or more vehicle-specific energy efficiency models. The travel routes are displayed via the navigation system, including a trace of the energy-optimized travel routes and an expected or relative energy efficiency along the energy-optimized travel routes. A vehicle includes the navigation system and a powertrain. A powertrain controller may control vehicle speed over a selected route to maintain an optimally energy-efficient speed.

17 Claims, 2 Drawing Sheets

(51) Int. Cl.
  *B60K 6/22*  (2007.10)
  *B60K 6/50*  (2007.10)
  *G01C 21/36* (2006.01)

(52) U.S. Cl.
  CPC ...... *B60Y 2300/244* (2013.01); *Y10S 903/904* (2013.01); *Y10S 903/915* (2013.01)

(56) References Cited

U.S. PATENT DOCUMENTS

| | | | | |
|---|---|---|---|---|
| 8,554,381 | B2* | 10/2013 | Bischof | G05B 23/0243 700/286 |
| 8,712,650 | B2* | 4/2014 | Koebler | B60L 15/2045 340/439 |
| 9,834,196 | B2* | 12/2017 | Morisaki | B60W 20/12 |
| 2007/0027593 | A1* | 2/2007 | Shah | B60W 50/00 701/29.4 |
| 2007/0106465 | A1* | 5/2007 | Adam | G01C 21/3492 701/533 |
| 2008/0125958 | A1* | 5/2008 | Boss | G01C 21/3469 701/123 |
| 2010/0063713 | A1* | 3/2010 | Albertson | F02D 13/06 701/112 |
| 2012/0136524 | A1* | 5/2012 | Everett | E02F 9/2045 701/24 |
| 2012/0271542 | A1* | 10/2012 | Arcot | G01C 21/3492 701/411 |
| 2013/0179062 | A1* | 7/2013 | Yasushi | G01C 21/3469 701/123 |
| 2013/0288206 | A1* | 10/2013 | Takeuchi | G08G 1/0112 434/65 |
| 2015/0275787 | A1* | 10/2015 | Dufford | F02D 29/02 701/102 |
| 2016/0211774 | A1* | 7/2016 | Degner | H02M 7/53875 |

\* cited by examiner

ENERGY-OPTIMIZED VEHICLE ROUTE SELECTION

TECHNICAL FIELD

The present disclosure relates to a system and a method for determining energy-optimized driving routes for a vehicle.

BACKGROUND

Vehicle navigation systems are used to determine a user's present position using global positioning system data. The present position is then displayed via a geocoded and annotated map. Example mapping data may include topographical, road network, and point of interest information. Such information is typically communicated to the navigation system from a remote geospatial database or accessed from an onboard memory location.

A recommended travel route may be determined by a navigation system based on the shortest time or distance between a route origin and a route destination for a given trip. The recommended travel route is then displayed as a map trace and/or as turn-by-turn driving directions. Such conventional approaches to route planning, while effective at determining the shortest distance or travel time, are less than optimal for determining the most energy efficient of available routes or for optimally controlling operation of the vehicle.

SUMMARY

A navigation system and accompanying method as disclosed herein are intended for use in determining an optimally energy-efficient travel route in a vehicle. An underlying algorithm enables various control actions based on information from the cloud and vehicle-specific energy consumption characteristics, with real-time adaptation of the energy consumption characteristics being possible in certain embodiments. Attendant benefits include the option of selecting a travel route that optimizes energy consumption within time or distance constraints, or of selecting travel routes and/or controlling the vehicle in a manner that maximizes overall energy efficiency.

It is recognized herein that route selection significantly impacts energy consumption over a given route or trip. Vehicle energy consumption is heavily impacted by factors such as speed, traffic conditions, and driving distance. Real-time driving conditions are constrained by legal speed limits as well as real-time weather and road surface conditions. While conventional navigation mapping software is able to provide route options that minimize travel time or distance based on real-time traffic conditions, such software does not typically consider energy efficiency of the particular vehicle in which the mapping software is being used. Thus, the fastest route is not necessarily the most energy efficient and vice versa. By way of example, given the option of using local roads versus a highway route with similar travel times, a hybrid vehicle relying primarily on electric power at lower speeds may use less energy traveling the local roads, while a conventional gasoline-powered vehicle may use less energy traveling the highway route at higher speeds where an internal combustion engine is relatively efficient.

In a particular embodiment, a method for generating energy-optimized travel routes in a navigation system of a vehicle includes generating candidate travel routes for a trip having a route origin and a route destination. The method also includes dividing each candidate travel route into route segments and then estimating expected travel speeds along each segment using real-time traffic data, speed limits, and/or other cloud information. Additionally, the method includes calculating an expected energy efficiency of the vehicle over each segment using a vehicle-specific energy efficiency model. Energy-optimized travel routes are then generated and displayed via the navigation system, including displaying a trace of the energy-optimized travel routes and an expected or relative energy efficiency of the vehicle along such routes.

The method may further include receiving a selection of one of the displayed energy-optimized travel routes, e.g., via a touch-screen input, and then displaying or broadcasting turn-by-turn driving directions for the selected energy-optimized travel route.

The navigation system may be programmed with multiple vehicle-specific energy efficiency models each corresponding to a characteristic of the vehicle, such as weight, or a number of active engine cylinders or a particular powertrain operating mode. In such an embodiment, the method may include determining the characteristic of the vehicle, selecting one of the energy efficiency models using the determined characteristic, and then calculating the expected energy efficiency using selected model.

The method may include determining actual energy efficiency of the vehicle over the route segments and adapting the vehicle-specific energy efficiency model, e.g., a map, curve, or data tables, over time using the actual energy efficiency.

A vehicle is also disclosed that includes drive wheels, a torque-generating device such as an engine and/or a traction motor, a transmission having an input member connected to the torque-generating device and an output member connected to the drive wheels, and the navigation system. The navigation system is configured to execute the method noted above.

The above-noted and other features and advantages of the present disclosure are readily apparent from the following detailed description of the best modes for carrying out the disclosure when taken in connection with the accompanying drawings.

DETAILED DESCRIPTION

Figure 1:
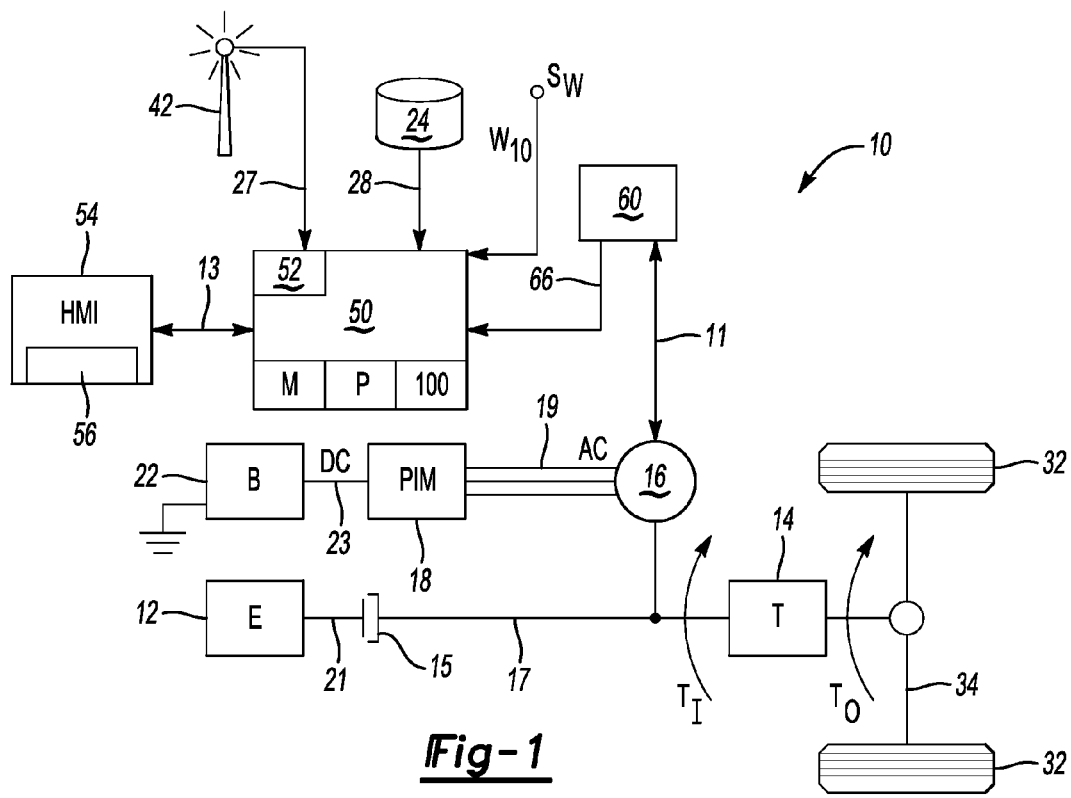
FIG. 1 is a schematic illustration of an example vehicle having a navigation system configured as disclosed herein.
Figure 2:
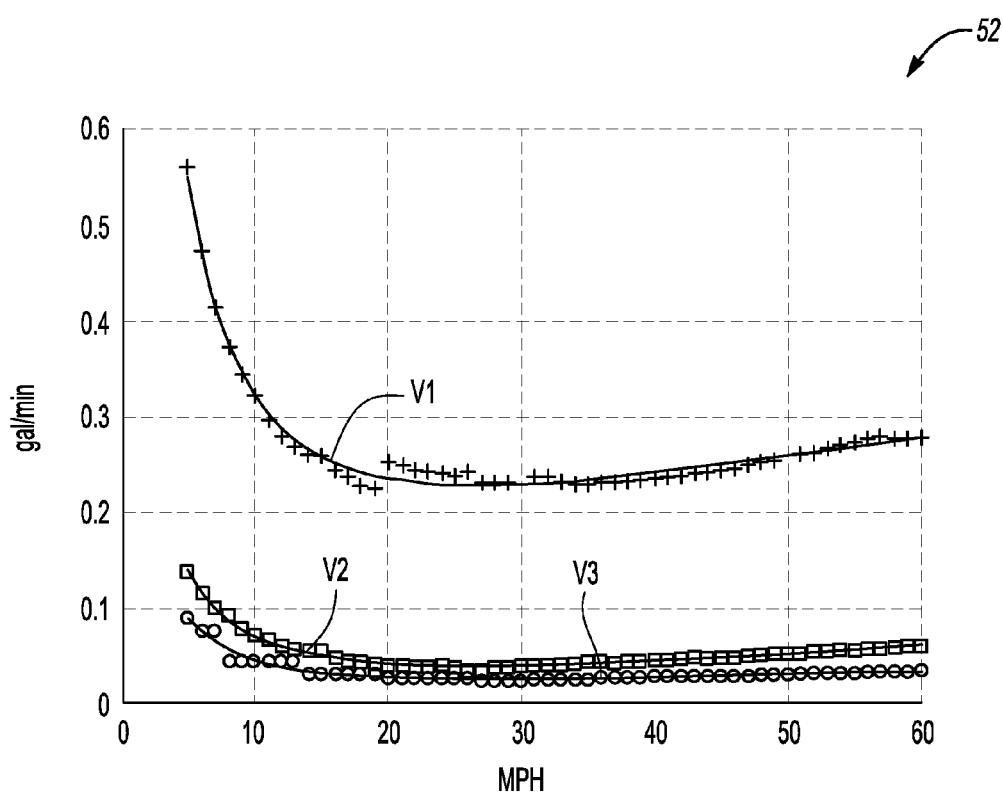
FIG. 2 is a plot of three vehicle-specific energy consumption models for three different example vehicle types.
Figure 3:
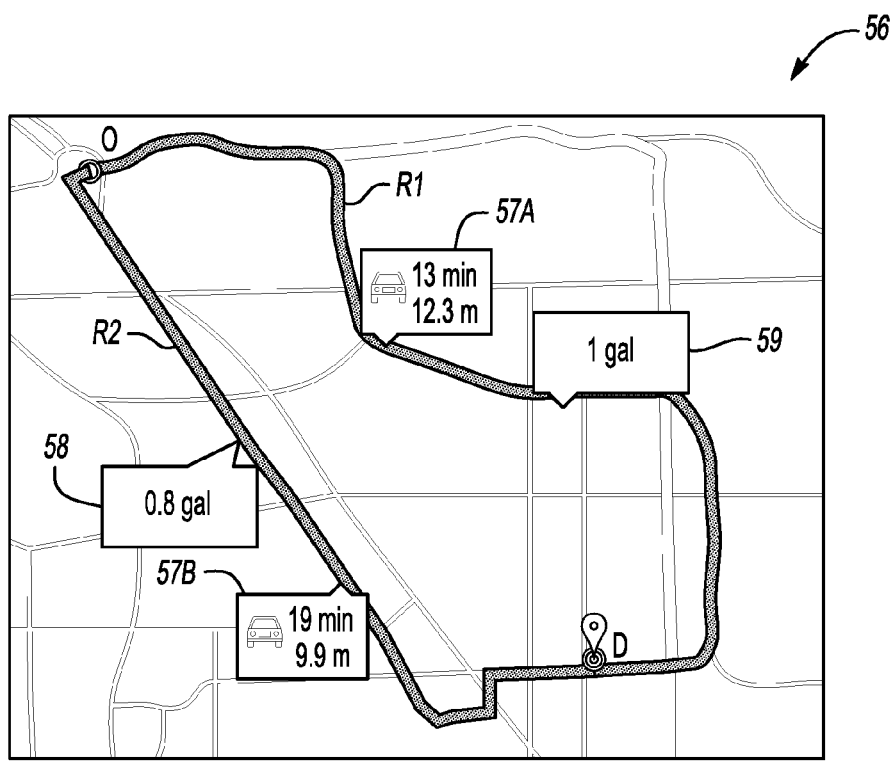
FIG. 3 is a schematic illustration of a route selection screen for a navigation system of the type shown in FIG. 1.
Figure 4:
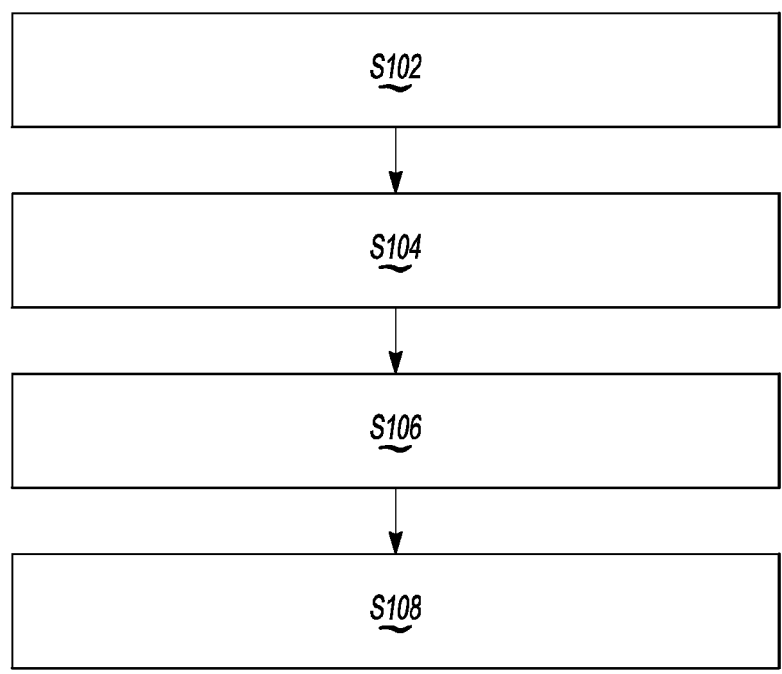
FIG. 4 is a flow chart describing a method for generating energy-optimized routes of travel in the vehicle depicted in FIG. 1.

Referring to the drawings wherein like reference numbers correspond to like or similar components throughout the several figures, and beginning with FIG. 1, an example vehicle 10 includes a navigation system 50 that uses vehicle-specific energy consumption models 52, examples of which are shown in FIG. 2, to automatically generate and display possible travel routes to an operator of the vehicle 10. An example route screen 56 is shown in FIG. 3, while an embodiment of a method 100 for energy-optimized vehicle route selection is depicted in FIG. 4. The term "fuel" as used herein may apply equally to gasoline, diesel, bio-fuel, ethanol, or other alternative fuels. The term "energy" refers to fuel as well as electricity, e.g., from a battery, fuel cell, or other power supply aboard the vehicle 10. The mix of energy for a given vehicle therefore depends on the nature of the powertrain used to propel that vehicle, whether as a hybrid electric vehicle as shown in FIG. 1, a conventional vehicle, or a battery electric vehicle.

The navigation system 50, using vehicle state information, is configured to automatically adapt the vehicle-specific energy consumption models 52 over time, with the models 52 being unique to the vehicle 10. For instance, the navigation system 50 may be initially programmed with curves or data tables describing the expected energy efficiency of the vehicle 10, with the possibility of the same models 52 being initially used for all vehicles 10 of the same model year, make, and model. Over time, however, the navigation system 50 updates or adapts the content of the models 52 based on actual demonstrated energy efficiency and driving behavior.

Referring briefly to FIG. 2, an example of such vehicle-specific energy consumption models 52 is shown as characteristic curves V1, V2, and V3 for three different vehicle types, in this instance a bus, a sport utility vehicle, and a sedan, respectively. Actual data points for characteristic curves V1, V2, and V3 are respectively denoted as +, □, and ○. Conventional best-fit techniques can be used to generate the characteristic curves V1, V2, and V3. Thus, over time the characteristic curves V1, V2, and V3 can be adapted as more data points are collected, with older data points being discarded in favor of newer ones, e.g., in a circular buffer or array.

As noted generally above, conventional mapping software accurately generates suggested travel routes with corresponding distances and estimated travel times, and also accounts for certain "look ahead" data such as traffic, accidents, construction, and road closures. Such software, however, is not informed as to past performance and current operating conditions of a given model year, make, and model of the vehicle 10, much less about the vehicle 10 in particular. The navigation system 50 therefore creates and adapts unique vehicle-specific energy consumption models 52 for the vehicle 10 for ongoing use in the method 100.

FIG. 2 is intended to show that different vehicles have different characteristic curves. Additionally, it is also true that for a particular vehicle type, e.g., a sedan, different sedans will have different curves. Moreover, even the same make and model of vehicle 10 could have, over time, different characteristic curves. For example, different maintenance behavior, road conditions, or different driving styles can result in variation in such characteristic curves from one vehicle 10 to another. The navigation system 50 therefore records the actual energy efficiency of the particular vehicle 10 within which the navigation system 50 is to be used. As is known in the art, telematics devices such as ONSTAR may have access to energy consumption characteristics of the vehicle 10. Therefore, in some embodiments a remote device 42 as shown in FIG. 1 may include or may be used with such a telematics service to free up onboard computational resources.

The navigation system 50 may adapt its approach to different loading conditions, i.e., with multiple vehicle-specific energy consumption models 52 used for the different loading conditions in different embodiments. By way of example, different models 52 may be used for different vehicle characteristics, such as a loaded weight, e.g., as determined via a weight or displacement sensor $S_W$ as shown in FIG. 1. Similarly, vehicles 10 equipped with automatic cylinder deactivation or "active fuel management" functionality can have multiple such models 52 depending on the number of cylinders presently in use. In other embodiments, the powertrain controller 60 may be operable for selecting a powertrain operating mode for the engine 12 and/or traction motor 16, and the navigation system may be configured with a plurality of the vehicle-specific energy efficiency models 52 each corresponding to a different one of the powertrain operating modes. The navigation system 50 is configured to determine from the current weight, number of active cylinders, or selected powertrain operating mode or other characteristic of the vehicle 10 which of the various models 52 to select and use in the execution of the method 100.

Referring again to FIG. 1, the navigation system 50 uses cloud information (arrow 27) transmitted from the remote source 42, doing so in conjunction with the characteristic curves embodying the vehicle-specific energy consumption models 52, in order to estimate energy efficiency of the vehicle 10 over various candidate routes of comparable travel time/distance. The most economic routes in terms of energy consumption are then displaced via a route screen 56 on a human-machine interface (HMI) device 54, e.g., a display or touch screen of a fixed or portable device, in conjunction with expected energy consumption over such routes.

The navigation system 50 may be embodied as one or multiple digital computers or data processing devices, each having one or more microprocessors or central processing units, read only memory, random access memory, electrically-erasable programmable read only memory, a high-speed clock, analog-to-digital circuitry, digital-to-analog circuitry, and any required input/output circuitry and devices, as well as signal conditioning and buffering electronics. While shown as a single device in FIG. 1 for simplicity and clarity, the various elements of the navigation system 50 may be distributed over as many different hardware and software components as are required. The vehicle 10 may include sensors such as the sensor $S_W$, which as explained below can determine a weight (arrow $W_{10}$) of the vehicle 10, e.g., via direct measurement of weight or displacement, in which case the navigation system 50 receives the weight (arrow $W_{10}$) from the sensor $S_W$ for use in some embodiments.

In various embodiments, the vehicle 10 of FIG. 1 may be a conventional vehicle, a plug-in hybrid, a standard hybrid electric vehicle, or an extended range electric vehicle. In the non-limiting illustrative embodiment shown in FIG. 1, the vehicle 10 includes an electric traction motor 16 that provides motor torque to a transmission (T) 14, and an energy storage system or battery (B) 22, e.g., a multi-cell rechargeable battery. A power inverter module (PIM) 18 may be electrically connected between the battery 22 and the traction motor 16 via a high-voltage AC bus 19, and used to invert DC power from the battery 22 into AC power for energizing phase windings of the traction motor 16 and vice versa, via pulse width modulation or other high-speed semiconductor switching processes as is well known in the art. A high-voltage DC bus 23 may be electrically connected between the PIM 18 and battery 22. A DC-DC power converter (not shown) may also be used as needed to increase or decrease the level of DC power to a level suitable for use by various DC-powered systems.

When configured as a hybrid electric vehicle as shown, or as a conventional vehicle, the vehicle 10 may include an internal combustion engine (E) 12 that selectively generates engine torque via an engine output shaft 21. Torque from the engine output shaft 21 can be used to either directly drive a transmission input member 17, and thus to propel the vehicle 10, e.g., in a hybrid electric vehicle design, or to power an electric generator in an extended-range electric vehicle design. An input clutch and damper assembly 15 may be used to selectively connect/disconnect the engine 12 from the transmission 14 and damp engine oscillations during the engine connection/disconnection process. Input torque (arrow $T_I$) is transmitted from the traction motor 16 and/or the engine 12 to the transmission 14, with output torque (arrow $T_O$) from the transmission 14 ultimately delivered to a set of drive wheels 32 via a drive axle 34. In the possible conventional embodiment noted above, the vehicle 10 would forego use of the traction motor 16 as a torque generator.

The vehicle 10 may further include a powertrain controller 60 that provides a corresponding powertrain control signal (arrow 66) to the navigation system 50 for use in the method 100. The powertrain controller 60 in one possible embodiment may be a hybrid control processor. In such an embodiment, the powertrain controller 60 may coordinate the input torque (arrow $T_I$) to the transmission 14 from the engine 12 and the traction motor 16 using feedback and control signals (double arrow 11), e.g., motor d-axis and q-axis currents, speed of the traction motor 16, phase voltages, etc. The powertrain controller 60 in turn reports the current powertrain state to the navigation system 50 as part of the powertrain control signals (arrow 66). The powertrain state may include information such as the number of cylinders of the engine 12 that are activate, the remaining energy or state of charge of the battery 22, whether or not the transmission 14 is in a fixed gear mode, an electric vehicle mode, an electrically variable transmission mode, and the like.

The navigation system 50 of FIG. 1 is in communication with the remote source 42 and a geospatial database 24. From the remote source 42, the navigation system 50 can receive the cloud information (arrow 27), including but not limited to weather data/road conditions, traffic conditions including traffic levels, accidents, and/or road construction/closures, and posted speed limits. Such cloud information (arrow 27) may also be used by the navigation system 50 in adapting the vehicle-specific energy consumption models 52 and ultimately determining the most energy efficient routes for the vehicle 10.

From the geospatial database 24, the navigation system 50 can also receive geospatial information (arrow 28) for use in generating models and energy-efficient routes for display. As used herein, the term "geospatial database" refers to a geographic information system containing geospatial data of multiple contiguous locations. The geospatial database 24 may be remotely located with respect to the navigation system 50 as shown, with the geospatial information (arrow 28) being accessible by the navigation system 50 using a transmitter/receiver (not shown). When the geospatial database 24 is local, e.g., stored on tangible media as mapping software and accessed directly by associated hardware components of the navigation system, the geospatial database may be positioned aboard the vehicle 10.

The navigation system 50 of FIG. 1 is configured to display recommended energy-efficient travel routes via the HMI device 54. The HMI device 54 may graphically or visually display the recommended travel route(s) via a graphical route/map trace and/or text-based turn-by-turn driving directions, such as is depicted in FIG. 3, and/or may be further configured with an audio speaker (not shown) that broadcasts turn-by-turn driving directions as audible speech. Additional data (double-headed arrow 13) to and from the navigation system 50 from the HMI device 54 may include information such as route origin and route destination for the trip, which may be manually entered via touch input as is well known in the art.

FIG. 3 depicts an example route screen 56 showing different recommended routes R1 and R2. Candidate routes are first determined by the navigation system 50 using conventional map planning techniques, such as optimal searching via dynamic programming wherein the optimal route(s) are searched against a given time or distance constraint and costs are associated with traveling each segment of the various possible routes. From the returned routes, the navigation system 50 can then use minimal energy consumption as a further cost constraint, again using local optimization, and thereafter display one or more alternative energy-efficient routes, with route R2 being an alternative to route R1 in the illustrative example of FIG. 3.

Text bubbles 57A and 57B may be displayed containing conventional route description data, e.g., the estimated time and distance of travel, for instance "19 min" and "9.9 m" for route R2 and "13 min" and "12.3 m" for route R1. Additional text bubbles 58 and 59 can be optionally populated with relative or actual energy consumption information for each of the routes R1 and R2. For instance, while actual values of 1 gallon (gal) and 0.8 gal are used in the depicted examples, the navigation system 50 may instead display relative values such as 1 for the conventional shortest/fastest route, in this case R1, and a value such as 0.8 for route R2 to indicate that traveling along route R2 would reduce energy consumption by about 20% relative to traveling along route R1.

That is, knowing the vehicle-specific energy consumption models 52 and corresponding characteristic curves of the vehicle 10, and knowing the constraints along alternative routes R1 and R2 in terms of posted speed limits, traffic, traffic lights, construction, etc., the navigation system 50 can estimate energy consumption of the vehicle 10 using demonstrated past behavior when traveling under similar traveling and vehicle state conditions. The operator can then select one of the displayed energy-efficient routes R1 and R2, with the navigation system 50 thereafter providing turn-by-turn driving instructions for navigating the selected energy-efficient route R1 or R2.

Referring to FIG. 4, the method 100 noted above enables energy-optimized travel routes to be generated via the navigation system 50 shown in FIG. 1. The method 100 includes the steps of generating a plurality of candidate travel routes for a trip having a route origin (O) and a route destination (D), e.g., using conventional route planning techniques based on shortest distance or travel time. The method 100 then divides each candidate travel route into a plurality of route segments, with such segments bounded by intersections, turns, landmarks, or other known break points.

The navigation system 50 then estimates expected travel speeds of the vehicle 10 along each segment, doing so using the cloud information (arrow 27) from the remote source 42 of FIG. 1. An expected energy efficiency of the vehicle 10 is calculated over each of the candidate travel routes and/or segments using the vehicle-specific energy efficiency models 52, with the energy-optimized travel routes then displayed via the navigation system 50, including displaying a trace of the energy-optimized travel routes and an expected or relative energy efficiency of the vehicle 10 along such routes.

A particular embodiment of the method 100 begins with step S102. The navigation system 50 of FIG. 1 uses the remote source 42 as a cloud service to obtain the cloud information (arrow 27) described above. The navigation system 50 then uses conventional mapping techniques to determine different route options each offering an acceptable travel time, e.g., within 5 minutes of a best possible transit time. Routes having an acceptable travel time relative to a calibrated or selectable time are considered to be candidate routes as noted above. The method 100 then proceeds to step S104.

At step S104, the navigation system 50 next divides each candidate travel route into segments. For instance, the navigation system 50 may identify break points from a recorded or detected starting point, i.e., the route origin (O), to a recorded destination point (D) and define local routes connecting the break points. The navigation system 50 then estimates travel speeds of the vehicle 10 along each of these segments based on the received cloud information (arrow 27) from step S102. For each route segment, the navigation system 50 may estimate the expected travel speed based on current traffic conditions, posted speed limits, and/or an expected driving strategy.

In a particular embodiment, the navigation system 50 may determine in real-time the most energy efficient vehicle speed trajectory for a given route with constrained speed and travel times. Such an approach may allow the engine 12 and/or motor 16 to operate closer to maximum efficiency. The vehicle 10 can then follow the speed trajectory with minimum energy consumption.

For instance, as part of step S104 the navigation system 50 of FIG. 1 may obtain the optimal cost for navigating each local route or segment starting from a particular break point, doing so based on traffic information to determine an average driving speed on each segment. Optionally, step S104 may entail using a probabilistic model to determine idle energy consumption, e.g., while waiting at a stop sign or light.

Step S104 may include determining an optimally energy-efficient driving speed along each of the plurality of energy-optimized travel routes, with a control action ultimately executed with respect to the vehicle 10 using the optimally energy-efficient driving speed. The optimally energy-efficient driving speed may be displayed or controlled. With respect to the latter option, controlling the speed of the vehicle 10 may be achieved automatically or autonomously via the powertrain controller 60 over a selected route or segment in response to a request from the navigation system 50. The navigation system 50 may determine an optimally energy-efficient speed range over the various segments, and then may request the powertrain controller 60 to exercise autonomous control over the various powerplants of the vehicle 10, e.g., the engine 12 and/or traction motor 16 of FIG. 1, so as to maintain vehicle speed within the optimally energy-efficient speed range bounded by any posted speed limits. That is, the navigation system 50 may request the powertrain controller 60 to automatically adjust the speed of the vehicle 10 as needed to maintain an optimally energy-efficient speed within the range defined by any upper and lower speed limits. Alternatively, the navigation system 50 may simply display speed prompts instructing an operator of the vehicle 10 to manually adjust driving speed as needed to meet to optimally energy-efficient driving speed.

By way of an example, given a time constraint the optimal solution provided by the navigation system 50 determines an optimal vehicle speed constrained by maximum and minimum speeds along the route or segment. Such an optimal solution can be obtained by assuming an optimal vehicle speed and then calculating the time (n) to travel a total distance (d). The speed trajectory $S_V(k)$ being controlled in this example illustration may be described mathematically as:

$$S_V(k) = \min(\max(S_v^{opt}, S_v^{min}(k)), S_v^{max})$$

where $S_V$ is the vehicle speed which minimizes the amount of work required to travel the distance (d), and thus the fuel or other energy consumed, with the time (n) constraint of:

$$n = \sum_{k=1}^{3} \frac{d_k}{\min(\max(S_v^{opt}, S_v^{min}(k)), S_v^{max}(k))}$$

In a vehicle 10 having the drive wheels 32 shown in FIG. 1, the steady-state road load power $P_K(W)$ may be described as:

$$P_K(W) = [2.73 C_R M_V + 0.0126 C_D A_V S_V(k)^2] \cdot S_V(k)$$

where $C_R$ is the coefficient of rolling resistance plus gradient resistance, i.e., determined by weight of the vehicle 10 and the steepness of any surface on which the vehicle 10 travels, $M_V$ is the vehicle mass in kilograms, $C_D$ is the drag coefficient, and $A_V$ is the frontal area of the vehicle 10 in meters squared (m²). Thus, the work (J) to be performed may be represented as:

$$J = \sum_{k=0}^{n-1} P_K(W)$$

Power $P_{(K)}$ can be replaced with the fueling rate, e.g., in g/s or gal/h, or the equivalent in electrical energy, as it is noted herein that such a rate is almost linearly proportional to power. Thus, a generalized optimal solution can be used as part of the method 100 to search for optimal vehicle speeds with the boundaries of upper and lower speed limits when searching for a vehicle speed providing the minimal energy consumption along a given route or segment.

Step S106 includes computing the expected energy efficiency for each segment of step S104 based on the expected travel speeds, and also determining the total expected energy consumption for route option. Energy consumption may be calculated as a function of vehicle speed, e.g., energy consumption=$a_1 + a_2$*vehicle speed+$a_3$(vehicle speed)³, with $a_1$, $a_2$, and $a_3$ being calibrated constants that are dependent on the type of vehicle 10 and its present operating state. Energy consumption characteristics vary depending on factors in the form of weight, driver behavior, and certain environmental conditions such as altitude. Thus, as part of step S106 the navigation system 50 may estimate weight of the vehicle 10 in real time, or may measure the weight reported by the sensor(s) $S_{10}$ of FIG. 1. Once this has been computed, the method 100 proceeds to step S108.

At step S108, the navigation system 50 next selects multiple candidate routes, again via dynamic programming based on optimal costs and given time constraints as noted above, and then displays the routes via the HMI device 54 with accompanying energy efficiency information, e.g., as shown in FIG. 3. As part of step S108, the operator may select a given route via touch input to the HMI device 54 shown in FIG. 1. Thereafter, the navigation system 50 can execute a control action with respect to the HMI device 54, e.g., by displaying turn-by-turn navigation instructions and/or a map to a destination along the selected energy-efficient route.

As part of the method 100, the navigation system 50 of FIG. 1 can be configured to compare actual energy consumption over a particular travel route with the estimated values recorded in the vehicle-specific energy consumption models 52. Thereafter, the navigation system 50 can adapt the models 52 in real time using the demonstrated actual energy efficiency, e.g., by recording the demonstrated energy efficiency as the characteristic curve or by averaging the actual energy efficiency into prior-collected data to improve the accuracy.

The concepts disclosed above can be readily applied to multiple destination scenarios in which the sequence of travel between the destinations is flexible. For instance, if an operator of the vehicle 10 of FIG. 1 requires three destinations to be visited on a given trip, but in no particular order, the navigation system 50 may generate and display different route options for visiting all three destinations in different orders. Thus, the method 100 described above may be modified such that the navigation system 50 receives multiple destinations instead of just one, and generates the candidate travel routes as noted above, starting with the route origin and traveling to the various route destinations. The navigation system 50 then displays energy-optimized travel routes from the route origin through the route destinations in an order that optimizes energy efficiency following the method 100. The navigation system 50, using the method 100 described above, can analyze energy efficiency of each route. The operator can then select the route based on the required time and energy consumption.

Additionally, vehicle-specific energy consumption closely correlates with vehicle speed, with conventional powertrain energy efficiency being degraded at lower speeds. As such, powertrain efficiency can be heavily traffic dependent. For instance, in morning or evening rush hour traffic, a conventional vehicle may experience relatively low energy efficiency. When driving the same route at a different time of day, e.g., mid-morning or late evening when traffic is light, or on a weekend, the same vehicle may experience a relatively high level of energy efficiency. Thus, the navigation system 50 of FIG. 1 may be configured to plan a trip well ahead of time using historical and real-time traffic patterns, with added constraints of minimum energy consumption, minimum travel time, or both.

More specifically, the navigation system 50 may use historical traffic information, e.g., based on time of day, and may even anticipate traffic conditions expected for special events such as holidays, parades, concerts, sporting events, and the like, all of which may be available as part of the cloud information (arrow 27). The navigation system 50 can then plan not only when to travel, but also could plan a particular sequence of visiting multiple destinations.

As with the various embodiments disclosed above, specific routes can be selected, but it may also be desirable for the operator to wait until an actual time of travel to select such a route so that real-time traffic conditions can be considered. For trip planning, therefore, a desired metric may be a particular time of travel, a particular level of energy consumption, and/or travel time. In practice, such an approach could be used ahead of time to determine time of travel and/or a particular sequence of destinations to visit. Thereafter, the method 100 described above may be used during the trip to determine a energy-efficient route to take based on real-time traffic other cloud information (arrow 27).

Using the above method 100 and navigation system 50, an operator of the vehicle 10 of FIG. 1 can enjoy a route selection strategy that can be used to select routes that minimize energy consumption within an acceptable time of travel. Simple adaptable vehicle-specific energy consumption models 52 are used to describe the vehicle-specific energy consumption characteristics, with the option of optimal sequencing of destinations to further minimize energy consumption. The present approach can be performed onboard using computational resources of the navigation system 50, or a remote implementation may be used in which ONSTAR or another telematics service can perform the energy consumption analysis and computations disclosed herein.

While the best modes for carrying out the disclosure have been described in detail, those familiar with the art to which this disclosure relates will recognize various alternative designs and embodiments for practicing the disclosure within the scope of the appended claims.

The invention claimed is:

1. A method for generating energy-optimized travel routes in a navigation system of a vehicle, the method comprising:
generating, via the navigation system, a plurality of candidate travel routes for a trip having a route origin and a route destination;
dividing each of the candidate travel routes into a plurality of route segments;
estimating expected travel speeds of the vehicle along each of the route segments via the navigation system using cloud information, wherein the cloud information includes mapping data from a geospatial database and traffic information along each of the route segments, and wherein the traffic information includes at least one of real-time traffic information and historic traffic information for the route segments;
calculating an expected energy efficiency of the vehicle over each of the route segments, including:
using a vehicle-specific energy efficiency model to determine an expected energy efficiency of the vehicle over the route segments, including determining an actual energy efficiency over the route segments over time, and adapting the vehicle-specific energy efficiency model in real-time based upon a comparison of the expected energy efficiency and the actual energy efficiency; and
displaying a plurality of energy-optimized travel routes via the navigation system using the calculated expected energy efficiency.

2. The method of claim 1, wherein displaying a plurality of energy-optimized travel routes includes displaying traces of the energy-optimized travel routes and the calculated expected energy efficiency of the vehicle.

3. The method of claim 1, further comprising: determining an optimally energy-efficient driving speed along each of the plurality of energy-optimized travel routes and executing a control action with respect to the vehicle using the optimally energy-efficient driving speed.

4. The method of claim 1, wherein the navigation system includes a plurality of the vehicle-specific energy efficiency models each corresponding to a characteristic of the vehicle, the method further comprising: determining the characteristic of the vehicle, selecting one of the vehicle-specific energy efficiency models using the determined characteristic, and calculating the expected energy efficiency using the selected energy efficiency model.

5. The method of claim 4, wherein the characteristic is a weight of the vehicle, and wherein determining the characteristic includes measuring a weight or displacement of the vehicle.

6. The method of claim 4, wherein the vehicle includes an engine, the characteristic is a number of active cylinders of the engine, and determining the characteristic includes determining the number of active cylinders.

7. The method of claim 1, wherein displaying the plurality of energy-optimized travel routes includes displaying the expected energy efficiency as a text bubble proximate the displayed energy-optimized travel routes.

8. The method of claim 1, wherein the traffic information includes the historic traffic information for the route segments, calculating an expected energy efficiency of the vehicle is conducted using the historic traffic information, and displaying a plurality of energy-optimized travel routes includes displaying a recommended start time for the trip.

9. The method of claim 1, wherein the traffic information includes the historic traffic information for the route segments, calculating an expected energy efficiency of the vehicle is conducted using the historic traffic information, and displaying a plurality of energy-optimized travel routes includes displaying energy-optimized navigation instructions for the trip.

10. The method of claim 1, wherein the vehicle includes a powertrain controller in communication with the navigation system, the method further comprising:
    determining an optimally energy-efficient driving speed along each of the route segments; and
    controlling a speed of the vehicle via the powertrain controller in response to a request from the navigation system to thereby maintain the optimally energy-efficient driving speed.

11. The method of claim 1, further comprising: receiving multiple route destinations via the navigation system, generating the plurality of candidate travel routes between the route origin and each of the multiple route destinations and between each of the route destinations, and displaying the energy-optimized travel routes from the route origin through each of the route destinations in an order that optimizes energy efficiency of the vehicle.

12. A vehicle comprising:
    a plurality of drive wheels;
    a torque-generating device;
    a transmission or gear train having an input member connected to the torque-generating device and an output member connected to the drive wheels; and
    a navigation system configured to:
        generate a plurality of candidate travel routes for a trip having a route origin and a route destination;
        divide each of the candidate travel routes into a plurality of route segments;
        estimate expected travel speeds of the vehicle along each of the route segments using cloud information, including real-time and historic traffic data and speed limits along each of the route segments;
        calculate an expected energy efficiency of the vehicle over each of the route segments using at least one vehicle-specific energy efficiency model, including:
        use a vehicle-specific energy efficiency model to determine an expected energy efficiency of the vehicle over the route segments, including determine an actual energy efficiency over the route segments over time, and adapt the vehicle-specific energy efficiency model in real-time based upon a comparison of the expected energy efficiency and the actual energy efficiency; and
        display a plurality of energy-optimized travel routes via the navigation system using the calculated expected energy efficiency, including displaying a trace of the energy-optimized travel routes and an expected or relative energy efficiency of the vehicle along each of the energy-optimized travel routes proximate the displayed travel routes.

13. The vehicle of claim 12, further comprising a sensor, wherein the navigation system includes a plurality of the vehicle-specific energy efficiency models each corresponding to a different weight of the vehicle, wherein the navigation system is configured to determine the weight of the vehicle using the sensor, select one of the vehicle-specific energy efficiency models using the determined weight, and calculate the expected energy efficiency using the selected vehicle-specific energy efficiency model.

14. The vehicle of claim 12, wherein the torque generating device includes at least one of an internal combustion engine and a traction motor, the vehicle further comprising: a powertrain controller operable for selecting a powertrain operating mode for the torque generating device, and wherein the navigation system includes a plurality of the vehicle-specific energy efficiency models each corresponding to a different one of the powertrain operating modes.

15. The vehicle of claim 12, further comprising: a powertrain controller in communication with the navigation system, wherein the navigation system is configured to determine an optimally energy-efficient driving speed along each of the plurality of energy-optimized travel routes, and wherein the powertrain controller is configured to control a speed of the vehicle over the selected route in response to a request from the navigation system to thereby maintain the optimally energy-efficient driving speed.

16. The vehicle of claim 12, wherein the navigation system is configured to receive multiple route destinations, generate the plurality of candidate travel routes between the route origin and the route destinations, and display the energy-optimized travel routes from the route origin through each of the route destinations in an order that optimizes energy efficiency of the vehicle.

17. The vehicle of claim 12, wherein the navigation system is configured to determine an optimally energy-efficient driving speed along each of the plurality of energy-optimized travel routes, and to display the optimally energy-efficient driving speed.

* * * * *